April 20, 1965 E. A. EDBERG 3,178,768
APPARATUS FOR MAKING FOAMED POLYMERIC STRUCTURES
Filed July 31, 1958 2 Sheets-Sheet 1

INVENTOR.
EDWIN A. EDBERG.
BY
Oscar B. Brumback.
his ATTORNEY.

April 20, 1965 E. A. EDBERG 3,178,768
APPARATUS FOR MAKING FOAMED POLYMERIC STRUCTURES
Filed July 31, 1958 2 Sheets-Sheet 2

INVENTOR.
EDWIN A. EDBERG.
BY
Oscar B. Brumback
his ATTORNEY.

United States Patent Office 3,178,768
Patented Apr. 20, 1965

3,178,768
APPARATUS FOR MAKING FOAMED
POLYMERIC STRUCTURES
Edwin A. Edberg, Sewickley, Pa., assignor to Koppers
Company, Inc., a corporation of Delaware
Filed July 31, 1958, Ser. No. 752,235
11 Claims. (Cl. 18—4)

This invention relates to an apparatus for making foamed polymeric structures and more particularly to an apparatus for making foamed polymeric boards or sheets.

Polymeric particles capable of being expanded by the application of heat are well known. A useful process for making such expandable polymeric materials is described in the co-pending U.S. application of Gaetano F. D'Alelio, Serial Number 394,230, filed November 24, 1953, now Pat. No. 2,983,692. According to this D'Alelio application, such expandable polymeric materials can be made from a variety of homopolymers and copolymers derived from hydrocarbon vinyl monomer. Such monomers are, for example, ethylene, styrene, nuclear dimethyl styrenes, isobutylene, vinyl naphthalene, etc., and such copolymers are, for example, styrene and butadiene, styrene and α methyl styrene, styrene butylene and α methyl styrene, styrene and isobutylene, styrene and dimethyl styrene, isobutylene and butylene. Particular polymers described that are useful are polystyrene and its copolymers with such monomers as butylene, α methyl styrene and α isobutylene. These expandable materials have incorporated therein from about 3–30 parts by weight, an aliphatic or cyclo aliphatic hydrocarbon boiling in the range of about 35–60° C. Suitable hydrocarbons include petroleum ether, pentane, hexane, heptone, cyclo pentane, cyclo hexane, cyclo pentadiene and esters thereof. Although the expandable polymeric particles are generically known as beads they may be round, pillow-shaped or irregularly shaped. Typical of such expandable polymeric material is the expandable polystyrene sold by Koppers Company, Inc. under the trade mark Dylite.

These expandable polymeric beads may be partly expanded prior to their further expansion into a final article. Particularly useful processes for partially expanding expandable polymeric materials are described in the co-pending U.S. applications of Hugh Rodman, Jr., Serial No. 689,195, filed October 9, 1957, now Patent No. 3,023,175; and Edwin A. Edberg and Richard H. Immel, Serial No. 705,540, filed December 27, 1957, now Patent No. 2,998,501, in which hot gas, infrared, steam and high frequency radio waves are used to heat the polymeric material to predetermined temperatures for a predetermined time which is advantageously short, thereby to partially expand a predetermined amount the polymeric material.

Conventionally, foamed or cellular polymeric structures in the shape of boards or sheets have been made by charging expandable polymeric material in an elongated mold having a substantially closed rectangular cavity therein and applying to the mold external heat such as with steam. Thus, the expandable polymeric material expands into a foamed polymeric structure corresponding to the rectangular shape of the molding cavity.

Difficulty has been encountered heretofore, when applying steam externally to the mold, in obtaining board of adequate thickness to meet the present requirements for thick board. For example, it is difficult to provide uniform heating of the polymeric material and an uneven heat transfer results in nonuniform expansion and poor fusion of the polymeric foam. This may be explained by the fact that some of the polymeric material, close to the surface of the mold, expands and thereafter acts as an insulator for the portion which has not yet been expanded.

Another difficulty encountered in making polymeric structures by the methods and apparatus known heretofore have been in obtaining foamed polymeric structures continuously in the shape of boards or sheets. For example, it has been time-consuming and inefficient to make foamed polymeric structures in the shape of boards or sheets by a batch method whereby a closed molding cavity is opened and closed to make one board at a time.

Furthermore, the methods and apparatus known heretofore have been particularly inadequate for structures of sandwich construction, i.e., for expanding expandable polymeric material in situ between conventional facing materials so as to make sandwich-type panels. For example, when applying heat externally to facing materials to expand polymeric material therebetween, the facing materials act as insulators; and uneven heat transfer results, so that there is non-uniform expansion and poor fusion of the polymeric foam.

This invention contemplates an apparatus for producing, through the use of expandable polymeric material, polymeric structures such as boards of polymeric material and polymeric-filled sandwich-type panels by continuously exposing the expandable polymeric particles in a moving molding space to steam injected from a steam source into the molding space. More particularly, this invention contemplates an apparatus for forming foamed polymeric structures including sandwich-type panels having a foamed polymeric core from expandable polymeric material by the use of steam comprising endless belts arranged to form an open ended molding space having continuously moveable sides, means for continuously charging expandable polymeric material into said molding space, means fixed in said space for continuously injecting steam into said molding space so as to heat said expandable polymeric material to cause expansion thereof into the shape of said molding space, and means for continuously removing expanded polymeric material as a shaped mass from said molding space.

The above and further novel features of the invention will appear more fully from the following detailed description when the same is read in connection with the accompanying drawing. It is to be expressly understood, however, that the drawings are not intended as a definition of the invention but are for the purpose of illustration only.

FIG. 4 is a partial cut-away and top view of the feed mechanism of FIG. 1.

FIG. 5 is a partial elevation of the steam probes of FIG. 1.

FIG. 6 is a cross section of FIG. 5 through VI—VI.

FIG. 7 is another embodiment of the steam probes of FIG. 5.

FIG. 8 is another embodiment for the cooling means of FIG. 1.

Figure 1:
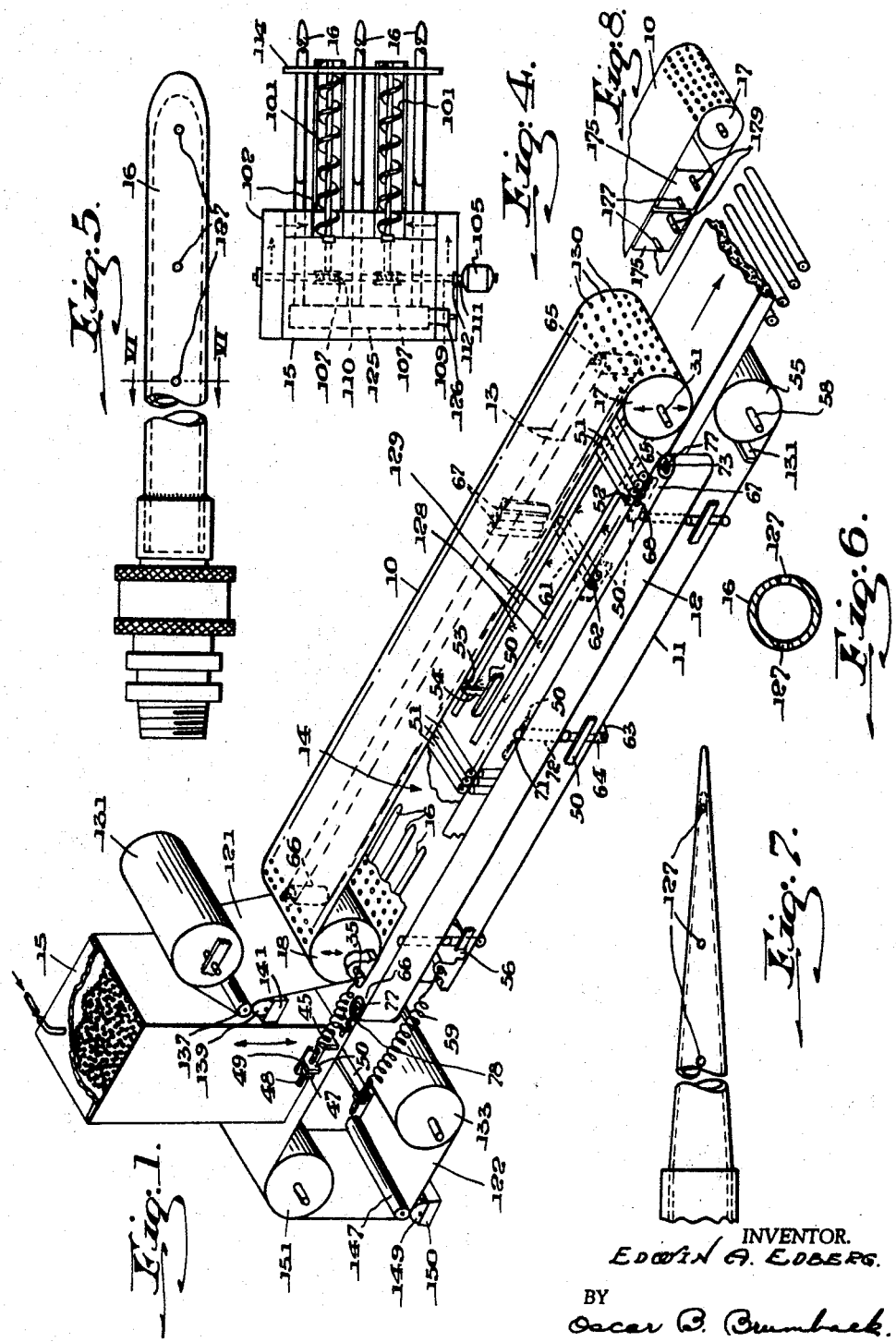
FIG. 1 is an isometric view and elevation of an embodiment of this invention in schematic.

Referring to FIG. 1 there are illustrated four endless moving belts 10, 11, 12, and 13, advantageously made of stainless steel, which form a molding space 14 having continuously moving sides. The expandable polymeric particles are charged from a hopper 15 into this space 14 where they are subjected to steam injected through probes 16. The heat from the steam causes the beads to expand to a light weight mass of foamed polymeric material having a closed cellular structure while the moving belts continuously remove the foamed material in a shaped mass from the space 14.

Figures 2, 3:
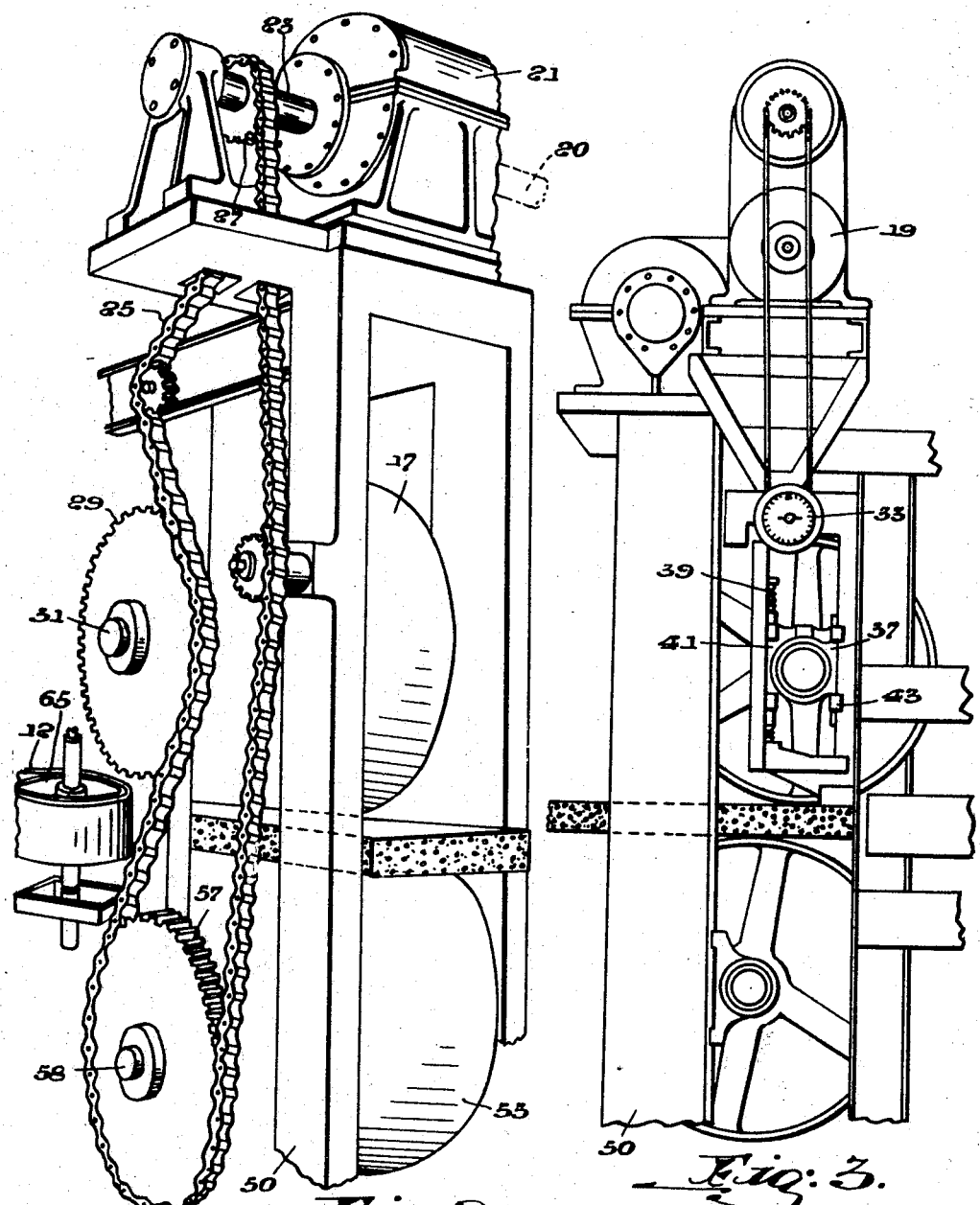
FIG. 2 is an isometric view of the drive mechanism of FIG. 1.
FIG. 3 is a partial elevation of the means for adjusting the thickness of the molding cavity of FIG. 1.

The endless top belt 10 extends over and between two drums 17 and 18 (FIG. 3) so that the belt 10 is held tautly therebetween and rotates evenly therewith. To this end an infinitely variable speed drive 19, such as the conventionally known "Reeves drive," is connected through a flexible coupling (not shown) and shafts (not shown) to input shaft 20 of gear reducer 21 (FIG. 2). The output 23 of the gear reducer rotates a chain 25 connected between sprocket 27 on output 23 and sprocket 29 on shaft 31 of drum 17. As the output 23 of the gear reducer 21 is much slower than the input 20 thereof connected to the variable speed drive 19, transmission of large torques to drum 17 are possible. Also a speed adjustment 33 for the variable speed drive 19 makes possible positively variable speed adjustments for belt 10.

The width of the foamed polymeric structures produced by the apparatus of this invention is determined by the width of belt 10, and this width is usually fixed. The thickness of the foamed polymeric structure as produced, however, is variable. To this end, shaft 31 of drum 17 and shaft 35 of drum 18 are mounted in conventional adjustable bearings 37 such as the DS "Takeup" bearings made by the Link Belt Co. so that drums 17 and 18 may be raised or lowered relative to the bottom fixed belt 11, to be described hereinafter, so as to increase or decrease the width of the molding space 14 for the production of foamed polymeric structures therein as described hereinafter. For this purpose the takeup bearings 37 have screws 39 which are rotatable in threaded pillow blocks 41 so that when the screws 39 are rotated the pillow blocks 41 move up or down on slide bearings 43.

Advantageously drums 17 and 18 are carefully positioned and held so that belt 10 is properly tensioned thereon to prevent slippage of the belt 10. To this end, adjustment springs 45 are provided at both ends of shaft 35 which are held taut by nut 47 which is threaded on rod 48 and held by a suitable bracket 49 connected to supporting frame 50. These nuts 47 may be threaded up or down on rod 49 to change the tension on springs 45 to increase or decrease the tension on belt 10. Springs 45 also serve to take up expansion and contraction in belt 10 caused by heat which is applied to the belt in a manner to be described hereinafter. In order to make belt 10 run evenly on drums 17 and 18 one nut 47 may be taken up tighter than the other so as to make the tension on one side of the belt greater than on the other side of the belt. The driving drum 17 may include a coating, advantageously rubber, which grips the belt 10 to prevent slippage of the belt.

To support the inside portion of belt 10, which forms one side of space 14 and which is adjacent belt 11 so that belt 10 resists the expansion of the polymeric material as described hereinafter, rollers 51 are mounted in suitable bearings 52 on frame 50. These rollers are spaced closely to each other and contact one side of belt 10 so that the adjacent side of belt 10 forms a substantially flat, moving molding surface. To support the outside or top portion of belt 10 which is not adjacent molding space 14 against sagging another roller 53 is provided which is mounted on frame 50 by means of a suitable bracket 54.

Bottom belt 11 is located below belt 13 and spaced axially therefrom in substantially parallel relation to belt 10 by means of drums 55 and 56 upon which belt 11 moves. Belt 11 is also driven by means of chain 25 which is connected to sprocket 57 mounted on shaft 58 of drum 55 and the size of the supporting and driving drums for belts 10 and 11 as well as the driving sprockets therefor are the same diameter respectively so that belts 10 and 11 move at the same surface speed. Drums 55 and 56 are substantially fixed against upward and downward movement in relation to belt 10 so that "Take up" bearings are not needed therefor. Springs 59 are provided, in like manner to springs 45, to properly tension belt 11 on drums 55 and 56. Drum 55 may also include a coating of a non-skid material, such as rubber, to prevent slippage of belt 11. Thus, the two belts 10 and 11 rotate at the same surface speed to provide a rectangular opening therebetween which forms a moving molding space open at both sides.

To support the inside portion of belt 11 which forms one side of space 14 and which is adjacent belt 10 so that belt 11 resists expansion of the polymeric material, as described hereinafter, rollers 61 are mounted in suitable bearings 62 on frame 50. These rollers are spaced closely to each other and contact one side of belt 11 so that the adjacent side of the belt forms a substantially flat, moving molding surface. To support the outside, or bottom portion of belt 11 which is not adjacent molding space 14 against sagging, another roller 63 is provided which is mounted on frame 50 by means of a suitable bracket 64.

To close this rectangular molding space on four sides so as to provide a moving molding space for the continuous production of foamed polymeric board and the like, endless belts 12 and 13 are provided which rotate on cylinders 65 and 66 respectively against the adjacent sides of belts 10 and 11. For example, belt 12 is mounted to contact one side of belts 10 and 11 and belt 13 is mounted to contact the other side of belts 10 and 11.

To support the inside portion of belts 12 and 13 which form the sides of molding space 14 against the expansion of the polymeric material, as described hereinafter, rollers 67 are mounted in suitable bearings 68 on frame 50 evenly to hold the inside of belts 12 and 13 against the adjacent sides of belts 10 and 11. To support against sagging and to guide the outside of belts 12 and 13 rollers 71 are provided which are mounted on frame 50 by suitable brackets 72 as best shown in FIG. 1.

Belts 12 and 13 may be rotated by suitable drive means on cylinders 65 and 66 or may be free to rotate with belts 10 and 11 caused by the expansion of polymeric material in space 14, as described hereinafter.

Cylinders 65 and 66 are movable up and down so as to ensure contact of belts 12 and 13 with the adjacent portions of belts 10 and 11 when belt 10 is moved up or down by providing moveable shafts 73 and 74 for cylinders 65 and 66. To this end collars 75 are held on the shafts 73 and 74 of cylinders 65 and 66 by set screws (not shown) and these collars are adjusted so as to allow these shafts to be moved up or down in their bearings 76 and 77.

Belts 12 and 13 are tensioned between their respective cylinders 65 and 66 by means of adjusting screws 78 which hold bearings 76 and 77. These adjusting screws 78 also serve to move the top and bottom of cylinders 65 and 66 toward or away from each other so as to make the belts run evenly on their respective cylinders.

It will be understood from the above that the four belts mentioned, namely belts 10, 11, 12, and 13, provide a molding space in the shape of an open ended parallelepipedon. This molding space thus provides a hollow open ended substantially rectangular-shaped space adapted for forming expandable polymeric material. Also, this space is adapted to receive the injection of polymeric material in one end thereof, as described hereinafter. Furthermore, the four moving belts mentioned are adapted to form a continuously moving open ended hollow substantially rectangular molding space as beads are fed thereto and these belts are adapted to transport continuously foamed material away from the space as the polymeric material is expanded.

The expandable polymeric material is fed to one end of space 14 by means of screws 101 which are enclosed in a suitable housing 102 located between steam probes 16 as best illustrated in FIG. 4. These screws are actuated by motor 105 which is connected to gears 107 mounted on one end of screws 101 by means of shaft 109 which has a worm gear 110 located at right angles to screws 101 so as to mesh with gears 107. Housing 102 has an opening 111 and a seal 112 for shaft 109 and this housing 102 is connected to a hopper 15 located on the side of frame 50 so as to feed polymeric beads charged in the hopper to the screws 101. To properly charge the enclosure 102 around the screws 101 the top of hopper 15 may be closed and air from a suitable source (not shown) under slight pressure may be applied to the top of the hopper by conventional means well known in the art so as to push the beads through the hopper to the screws 101. The free end of the screws 101 is inserted through a baffle plate 114 which also has holes for the insertion of the steam probes 16 therethrough. This baffle plate is narrow enough to provide clearance for top and bottom faces 121 and 122 respectively inserted into space 14 above and below the steam probes 16, as described hereinafter, and wide enough substantially to prevent polymeric beads from escaping backward between the baffle plate and the top and bottom belts 10 and 11.

Thus, polymeric beads are fed into space 14 and when the polymeric beads are expanded, as hereinafter described, these expanded beads present a resistance to the charging by screws 101. This makes possible the proper filling of polymeric beads into space 14 so that the beads fed to the cavity by the screws substantially fill the space between the four belts forming the space from the screws to the expanding beads. This feeding apparatus has the advantage of properly feeding polymeric beads to space 14 for board which is as wide as five feet or more and as thick as three feet or more. It also has the advantage of resisting the back pressure of the steam injected through probes 16, as described hereinafter.

It is understood that expandable polymeric material, for example such as made by the process of D'Alelio supra, may be used to charge the molding space 14 as virgin material or as pre-expanded polymeric material, such as made by the processes of Rodman, Teach and Tress, or Edberg and Immler supra and capable of further expansion. Advantageously the pre-expanded material is used to charge the space 14, although the only difference in the process of this invention used for expanding the expandable or pre-expandable material is that the belts mentioned are driven at different linear speeds. Thus, for the pre-expanded expandable material the speed of the belts may be increased to produce finished polymeric material at a faster rate than with the non pre-expanded material. Also for less dense board pre-expanded material is used.

Some polymeric material fed to space 14 may spill on the bottom portion of belt 11 which is being moved around to form part of space 14. Since some of these beads may be carried between the belt 11 and its supporting drums, scrapers 131 are provided which remove the spilled material before being rotated on drums 17 and 15 respectively.

Steam probes 16 provide the means for expanding the polymeric material which expanded material closes the one open end of space 14. To this end probes 16 extend through the baffle plate 114 and into molding space 14 for the introduction of steam therein which causes the polymeric material fed into space 14 to expand. For this injection of steam the probes 16 are connected to a steam manifold 125 which in turn is connected to a suitable steam source (not shown). Suitable valves (not shown) are provided for adjusting the rate and pressure of the steam injected through the probes and advantageously a valve 126, such as a Leslie control valve, model LLKY, made by the Leslie Company of Lindehurst, New Jersey, is interposed between the steam source and manifold 125 to maintain an even steam pressure on the manifold 125 and the probes 16. Steam is injected into space 14 by means of holes 127 located in the sides of the probes 16 (FIG. 6). In order to prevent expansion or foaming of the beads too soon after being filled into space 11, for example, before the beads are injected into space 14 by screws 101 the closest holes in the steam probes toward screws 101 are located a distance from the end of screws. These holes are located at spaced intervals along the probes and directed horizontally on both sides of the probes to the end of the probes as shown most clearly in FIG. 5 and the cross sectional area of the holes 127 is advantageously less than the widest cross sectional area of probes 16 so as to maintain equal steam pressure in the probes.

To prevent the heated polymeric material from seizing the probes, the probes are advantageously smooth and made of material having a low coefficient of friction. To this end, the probes may be of smooth stainless steel or may be coated with a material having a low coefficient of friction such as the "Teflon" brand of polytetrafluoroethylene made by Du Pont de Nemours & Co. of Wilminton, Delaware.

One advantageous method of applying the polytetrafluoroethylene to the probes comprises cleaning the probes of any rust, grease, organic coatings or dirt by vapor blasting with a water dispersion of fine grit, washing off the grit with water and air, and then washing the probes with a volatile solvent such as carbon tetrachloride. The polytetrafluoroethylene, as a low viscosity dispersion in a water medium, is applied to the probes by spraying at room temperature (but it is also possible to dip the probes repeatedly until the proper coating thickness is achieved, about .001–.010 inch thick), and the coating is dried, preferably at room temperature below about 150° F., until the water of the dispersion is evaporated. Thereafter, the polytetrafluoroethylene-coated probes should be baked at a temperature of at least approximately 675° F. until sintering of the polytetrafluoroethylene occurs. It has been found that rapid cooling of the coating by quenching in cold air or water improves the hardness of the coating. It has also been found desirable to use several thin coatings, it being preferable to use the above described drying and baking steps between the application of the polytetrafluoroethylene layers to prevent "orange peeling" or "mud cracking" upon drying as well as to permit reasonably rapid vaporization of the dispersing agent during the sintering operation.

In order to properly expand the polymeric material charged into the space 14, as described above, the steam injected into cavity 14 through steam probes 16, as described above, must heat the expandable polymeric material at least to a temperature range wherein softening of the polymer occurs and wherein the aliphatic blowing agent causes expansion of the polymer. The steam, however, must not heat the expandable material to a temperature which melts the polymer. For proper expansion of the aliphatic hydrocarbon, i.e., blowing agent as described in D'Alelio supra, it should have a boiling range of from 45–60° C. and should comprise 3–30% by weight of the total weight of the expandable material. It is understood, however, that the upper and lower temperature limits for the proper expanding will vary with the polymeric material. For example, when expandable polystyrene is heated the steam must cause a temperature of from about 100–125° C. to cause expansion and softening of the polymeric particles. Generally speaking, with regard to the upper limit, this temperature should not exceed about 135–150° C.

The required temperature also varies with the density of the expandable polymeric material. For example, when expandable polystyrene having a density of two pounds per cubic foot is heated in accordance with this invention a temperature of about 110° C. is sufficient to soften the polymer and promote expansion. If the density of the material is decreased to about one pound per cubic foot a temperature of about 120° C. is required.

For control purposes the temperature of the steam injected into space 14 may be physically measured. One advantageous way of doing this is to control the steam pressure of the steam injected into space 14. For example, suitable pressure gages may be attached to the steam probes 16 and the pressure of the steam therein may be adjusted by suitable valves (not shown) as mentioned above. Advantageously it has been found that the steam pressure in the probes should be maintained at approximately 35–40 p.s.i.g. thus to maintain the temperature of the steam constant. Since the heat absorbed by the polymeric material per unit volume of material ultimately determines the temperature of the expandable material the speed of the belts mentioned can be changed to control the exposure time of the expandable material so as to form foamed polymeric material.

After the polymeric beads are expanded by the injection of steam through steam probes 16 so as to take the shape of the molding space 14, the outside of the expanded material is cooled so that the expanded material can be removed from the machine and cut without any further expansion or distortion. To this end a plurality of air cooling nozzles 128 having a suitable source of air (not shown) are located on the inside of the adjacent portions of belts 10 and 11. These air nozzles 128 have air inlet pipes 129 connected to the air source. These nozzles 128 serve the purpose of cooling the polymeric material on its outside surface to about 120° F. so as to prevent further expansion and distortion of the expanded material whereby the length of the molding space 14 is reduced. To expedite this cooling effect, belts 10 and 11 may have small perforations 130 therethrough.

The apparatus has been so far described as being used to make foamed polymeric structures having a substantially rectangular shape; and it has the advantage of making such structures more efficiently than apparatus known heretofore. In accordance with this invention, the apparatus can also be used to make sandwich-type polymeric structures as well as solid foamed polymeric boards. To this end rollers 131 and 133 are disposed respectively adjacent drums 18 and 56. These rollers are supported in a conventional way on frame 50 and have flexible material, such as sheet aluminum or paper coiled thereon.

Roller 131 feeds a sheet of facing material 121 between rollers 137 and 139 for the application of glue on the bottom of the facing material 121. To this end roller 137 is supported by conventional means in a glue vat 141 and roller 137 presses the facing 121 thereon so as to rotate roller 137 whereby glue is evenly applied to the bottom of the facing 135. Thereafter facing sheet 121 is fed to the bottom of belt 10 by compression between the belt 10 and the foamed polymeric material described.

Likewise roller 133 is mounted in a conventional manner on frame 50 so as to carry facing material 122 for the bottom facing of the sandwich-type panel. To this end roller 139 feeds the facing material 122 coiled thereon between rollers 147 and 149. Roller 147 rotates in a glue vat 150 and roller 149 rotates with the facing 122 so as to rotate roller 147 whereby glue is evenly applied to one side of facing 122. Thereafter the facing 122 having glue thereon is fed to roller 151 which feeds the facing evenly to the top of belt 11 by compression between belt 11 and the expanded polymeric material which expands against the facings 121 and 122 to become fixed to the facings by means of the glue coated thereon so that a completed sandwich-type panel is fed from the end of the machine through drive drums 17 and 55 for cutting by conventional means such as with a band saw or the like.

Materials useable in accordance with this invention for facings include all types of flexible sheets with or without stiffening members or ribs. Flexible sheets suitable for the preparation of the various panel structures, for example, include such materials as polymeric sheets, i.e., cellophane, polyethylene, polystyrene and the like, various metallic foils, i.e., aluminum foil and stainless steel foil, and paper-like sheets such as kraft paper, jute paperboard, corrugated paperboard, manila paperboard, straw paperboard and the like.

The opposed surfaces of the facing material are coated with an adhesive in a conventional manner to provide adherance between the cellular polymeric structure and the facing material. Various conventional adhesives can be used herein, for example with kraft paper a conventional starch adhesive or substantially one modified with a urea formaldehyde or resorcinol formaldehyde resin to enhance water resistance works quite well. Alternately such adhesives as sodium silicate, polyvinyl alkyl asbestos (molten or in an emulsion), resorcinol-formaldehyde, resorcinol-phenol, modified resorcinol-formaldehyde resins, polystyrene latices and the like can be used. Generally speaking, elastomeric-type adhesives are quite suitable.

It is also to be understood that rigid inextensible nonflexible facing sheets with or without stiffening ribs may be fed to space 14 on the top and bottom of screws 101 and steam probes 16. For example, these non-flexible facings may be fed between baffle 114 and belt 10 and between baffle 114 and belt 11 by hand or suitable conveyors (not shown). Such rigid sheets include plywood, light gage aluminum, light gage steel, hardwood board, vegetable fiber board, cement asbestos board, gypsum paperboard, phenolic-type resin-impregnated laminates and the like. To this end the opposed surfaces of the rigid facing materials are coated with an adhesive in a conventional manner to provide adherance between the cellular polymeric structure and the facing material.

The finished foamed polymeric board or sandwich-type panel becomes fire-retardant by coating the expandable polymeric beads with various materials before filling the beads into space 14. Advantageously for this purpose the beads are coated with a paste comprising between about 30–50% by weight water and containing between about 10–30 parts by weight based on the weight of said beads of a chlorinated aliphatic hydrocarbon containing at least 65% by weight chlorine and 2.5 to 20 parts by weight based on the weight of said beads of antimony oxide. Halowax brand chlorinated naphthalene made by Koppers Company, Inc. may also be used instead of antimony oxide.

In operation, drive 19 is energized through a switch (not shown) from a suitable source of electrical energy (not shown). This drive 19 rotates the input of gear reducer 21 whereby the output 23 thereof is rotated at a slow speed compared to the input. The output 23 rotates chain 25 by means of sprocket 27 and rotates sprocket 29 to rotate shaft 31 of drum 17 and sprocket 57 to rotate shaft 35 of drum 55. The rubber coating on the drums 17 and 55 grip the belts 10 and 11 respectively and rotate these belts on idler drums 18 and 56 respectively so as to form the moving top and bottom of molding cavity 14. Springs 45 maintain the proper tension on belt 10 and springs 59 maintain the proper tension on belt 11. Screws 39 maintain the proper height adjustment of drums 17 and 55. Suitable adjustments to nuts 47 on rods 48 are also made to maintain the even rotation of belts 10 and 11 respectively on their supporting drums.

The speed adjustment 33 of variable speed drive 19 is adjusted so as to rotate both belts 10 and 11 at a predetermined speed of about from five to ten feet per minute. Then expandable polymeric material such as expandable polystyrene is fed from hopper 15 to screws 101 having a motor 105 which is actuated by a suitable switch (not shown) from a suitable energy source (not shown) so as to force the polystyrene beads into molding space 14. As the polystyrene beads are fed to space 14 they are prevented from escaping therefrom at the sides of belts 10 and 11 by belts 12 and 13 respectively which run against the sides of belts 10 and 11.

Steam is injected into space 14 through steam probes 16 at about 30 p.s.i. so as to cause the beads to expand. As the beads expand they exert a pressure against the adjacent portions of belts 10 and 11 and this force is resisted by rollers 51 and 61 respectively. Also, as the polystyrene beads expand they exert a force against belts 12 and 13 respectively and thus cause the belt to move with the moving expanded polymeric material. Further, as the beads expand they exert a force against the belts 12 and 13 and this force is resisted by rollers 67 which are mounted by suitable means inside the belts.

Thereafter, air is advantageously forced against the inside of belts 10 and 11 so as to cool the surface of the polymeric material to about 120° F. or below to prevent further expansion of the polymeric material.

As the belts mentioned move along on their respectively supporting cylinders, they carry the expanded polymeric board out the end of the machine described through drums 17 and 55.

After the apparatus described begins to make foamed polymeric board, facings 121 and 122 may be fed between drums 18 and 56 respectively after being coated on one side with a suitable adhesive. The expanding polymeric material thereupon compresses facing 121 between the foamed polymeric material and belt 10 and facing 122 between the foamed polymeric material and belt 11 whereby the foamed material is attached to the facings so that sandwich-type board emerges from the end of the machine of this invention through drums 17 and 55.

When narrow polymeric structures are made it may be advantageous to use cooling chests 175 (FIG. 8) in which case these cooling chests are substituted for the rollers 51 and 61 respectively for supporting the belts 10 and 11 respectively against the expansion of the polymeric material and substituted for the air jets for cooling the polymeric material so as to prevent further expansion thereof. Such cooling chests are rectangular in shape and have inlets 177 and outlets 179 for circulating water therein.

Another embodiment for feeding polymeric material into space 14 when narrow polymeric structures of thin cross-section are made comprises a hopper similar to hopper 15 without screw feeds. In this case it has been found that the weight of the polymeric beads being fed from the hopper has been sufficient to properly feed expandable polymeric beads into space 14.

Another embodiment for the steam probes is shown in FIG. 7. In this embodiment the probes 216 have about a 1% to 2% taper from the probe axis along the sides of the probes. This embodiment prevents seizing of the probes by the expanding polymeric material by presenting a decreasing amount of probe surface for the expanding polymeric material to grasp.

This invention, by providing means for feeding polymeric material into an open ended molding space having elongated movable sides and means in said space for injecting steam into said space continuously provides means for continuously making foamed polymeric board and sandwich-type panels having foamed polymeric core.

What is claimed is:

1. Apparatus for forming foamed polymeric structures from expandable polymeric material comprising an open ended hollow molding space having four moveable sides, a plurality of probes having holes therein for the continuous injection of steam into said space, means for holding said probes in said space, means for continuously charging said expandable polymeric material into said space at a first end thereof, said steam probes being fixed in said space at said first end thereof and extending in a direction generally parallel to the direction of travel of said expandable polymeric material through said space whereby said steam heats said polymeric material to cause said material to expand into the shape of said space, and means for continuously moving the sides of said space so as to continuously remove the polymeric material which has been exposed to said steam from said space as a shaped mass.

2. Apparatus for forming foamed polymeric structures from expandable polymeric material comprising an open ended molding space having sides provided by four continuously movable endless belts located at right angles to each other, means for charging said space at a first end thereof with expandable polymeric material, steam probes fixed in said space at said first end thereof and extending in a direction generally parallel to the direction of travel of said expandable polymeric material through said space having a plurality of small holes therein for injecting steam into said space, means holding said steam probes in said space, means causing steam to flow through said probes under a predetermined pressure and into said space thereby to expand said material into the shape of the molding space, means for cooling said expanded polymeric material, and means for moving the sides of said space so as to continuously remove said polymeric material from said steam probes and out of said space in a shaped mass after being exposed to steam, said steam probes having a surface with a low coefficient of friction for preventing the expanding polymeric material from seizing the steam probes.

3. Apparatus for forming foamed polymeric structures from expandable polymeric material comprising an open ended molding space having four sides provided by four continuously moveable endless belts located at right angles to each other, means for charging said space at a first end thereof with expandable polymeric material, steam probes having a plurality of small holes therein for injecting steam into said space, means fixedly holding said steam probes fixed in said space at said first end thereof, said steam probe extending in a direction generally parallel to the direction of travel of said expandable polymeric material through said space, means causing steam to flow through said probes under a predetermined pressure into said space thereby to expand said material into the shape of the molding space, means including air jets for cooling said expanded polymeric material, and means for moving the sides of said space so as to continuously remove said material away from said steam probes and out of said space in a shaped mass after being exposed to steam, said steam probes being coated with polytetrafluoroethylene to prevent seizing of the probes by the expanding polymeric material.

4. Apparatus for forming foamed polymeric structures from expandable polymeric material comprising an open ended molding space having four sides provided by four continuously moveable endless belts located at right angles to each other so as to form an open ended parallelepipedon, means for charging said space with expandable polymeric material at a first end thereof, steam probes having a plurality of small holes therein for injecting steam into said space, means holding said steam probes fixed in said space at said first end thereof and extending in a direction generally parallel to the direction of travel of said expandable polymeric material through said space, means causing steam to flow through said probes under a predetermined pressure and into said space thereby to expand said material into the shape of the molding space, rollers in contact with the inside of said belts to resist the pressure of said expanding polymeric material and whereby said space is maintained in the form of an open ended parallelepipedon, cooling nozzles for forcing air between said rollers to cool said expanded polymeric material against further expansion and distortion, and means for moving said sides of said space so as to continuously remove said material away from said steam probes and out of said space in a shaped mass after being exposed to steam, said probes being tapered at about 1-2° from their axis so as to present a decreasing probe surface to said expanding polymeric material whereby seizing of said probes by said material is prevented.

5. Apparatus for preparing a sandwich-type panel structure of low density cellular polymeric material having uniform small voids interposed between fixed sheets of facing material from partially expanded polystyrene beads which are capable of further expansion comprising an open ended four sided molding space having moveable sides, said moveable sides including four extended endless belts mounted at right angles to each other so as to form an open ended parallelepiped shaped space, means for feeding said polystyrene beads into said space at a first end thereof, means fixed in said space at said first end for injecting steam into said space, said last named means including steam probes extending in a direction generally parallel to the direction of travel of said expandable polymeric material through said space and said probes being held in said space so as to inject steam therein at a point after said beads are fed into said space, means for feeding facing materials between said polystyrene beads and top of said space, means for feeding facing material between said polystyrene beads and the bottom of said space, means for cooling said expanded polymeric material, means for moving the sides of said space so as to remove said beads away from said steam injecting means and out of said cavity after being expanded into the shape of said space, and low friction means for supporting said sides against the expansion of said expandable polymeric material.

6. Apparatus for preparing a sandwich-type panel structure of low density cellular polymeric material having uniform small voids interposed between fixed sheets of facing material from partially expanded polystyrene beads which are capable of further expansion comprising an open ended four sided molding space having moveable sides, said moveable side including four extended endless belts mounted so that portions of their edges are in contact to form an open ended parallelepiped shaped space, means for feeding said polystyrene beads into said space at a first end thereof, means fixed in said space at said first end for injecting steam into said space, said last named means including steam probes extending in a direction generally parallel to the direction of travel of said expandable polymeric material through said space, said steam probes being held in said space so as to inject steam therein at a point after said beads are fed into said space, means for feeding facing materials between said polystyrene beads and the top of said space, means for feeding facing material between said polystyrene beads and the bottom of said space, means for moving the sides of said space so as to remove said beads away from said steam injecting means and out of said space after being expanded into the shape of said cavity means for cooling said polymeric material in said sandwich-type panels before being removed from said space so as to reduce the length of said space, and low friction means for supporting said sides against the expansion of said expandable polymeric material.

7. Apparatus forming foamed polymeric structures from expandable polymeric material by the use of steam comprising four endless belts arranged adjacent each other to form a hollow open ended parallelepiped shaped molding space which is substantially rectangular in cross section having continuously moveable sides, means for continuously charging expandable polymeric material into said molding space at a first end thereof, and means fixed in said space at said first end for continuously injecting steam into said space so as to heat said expandable polymeric material to cause expansion thereof into a light weight mass of foamed polymeric material having a closed cellular structure with a shape which in cross section substantially corresponds to the rectangular shape presented by said molding space, said means for injecting steam into said molding space including steam probes extending in a direction generally parallel to the direction of travel of said expandable polymeric material through said space, and said steam probes being in the shape of elongated tubes having holes in the sides thereof for transmitting steam into said space and said probes also having a thin coating of polytetrafluoroethylene thereon which reduces the friction between said expandable polymeric material and said probes.

8. Apparatus forming foamed polymeric structures from expandable polymeric material by the use of steam comprising four endless belts arranged adjacent each other to form a hollow open ended parallelepiped shaped molding space which is a substantially closed rectangular area in cross section, means for continuously charging expandable polymeric material into said molding space at a first end thereof, and means fixed in said space at said first end for continuously injecting steam into said molding space so as to heat said expandable polymeric material to cause expansion thereof into a light weight mass of foamed polymeric material having a closed cellular structure with a shape which in cross sectional area substantially corresponds with the substantially rectangular cross section of said molding space, said means for injecting steam into said molding cavity including elongated hollow steam probes having holes through the sides thereof for transmitting steam into said space, said probes extending in a direction generally parallel to the direction of travel of said expandable polymeric material through said space, said probes also having sides which are tapered to a point so as to provide a decreasing probe surface area to said expandable polymeric material as said polymeric material expands and is thereby continuously transported by cavity wall cooperation away from said probes.

9. Apparatus forming foamed polymeric structures from expandable polymeric material by the use of steam comprising endless belts arranged to form an open-ended molding space having four continuously movable sides, means for continuously charging said expandable polymeric material into said molding space at a first end thereof, means for continuously injecting steam into said space so as to heat said expandable polymeric material to cause expansion thereof into the shape of said molding space, said means for continuously injecting steam comprising a plurality of probes fixed in said space at said first end and extending in a direction generally parallel to the direction of travel of said expandable polymeric material through said space, and means for continuously removing expanded polymeric material as a shaped mass from said molding space.

10. Apparatus for forming foamed polymeric structures from expandable polymeric material comprising an open-ended molding space having four sides provided by movable endless belts located at right angles to each other, steam probes having a plurality of small holes therein for injecting steam into said space, means for charging said space at a first end thereof with expandable polymeric material whereby the steam expands said material into the shape of the molding space, means holding said steam probes fixed in said space at said first end thereof, and means causing steam to flow through said probes into said space at a predetermined pressure, said steam probes extending in a direction generally parallel to the direction of travel of said expandable polymeric material through said space.

11. Apparatus for forming foamed polymeric structures from expandable polymeric material comprising an open ended hollow molding space having movable sides, a plurality of probes having holes therein for the continuous injection of steam into said space, means for holding said probes in said space, means for continuously charging said expandable polymeric material into said space at a first end thereof, said steam probes being fixed in said space at said first end thereof and extending in a direction generally parallel to the direction of travel of said expandable polymeric material through said space whereby said steam heats said polymeric material to cause said material to expand into the shape of said space, and means for continuously moving the sides of said space so as to continuously remove the polymeric material which has been exposed to said steam from said space as a shaped mass.

References Cited by the Examiner

UNITED STATES PATENTS

| | | | |
|---|---|---|---|
| 1,487,726 | 3/24 | Debay | 25—99 |
| 1,517,713 | 12/24 | Debay | 25—99 |
| 1,730,638 | 10/29 | Young | 18—14 |
| 1,925,545 | 9/33 | Royle | 18—14 |
| 1,949,175 | 2/34 | Netzel | 18—6 |
| 1,977,374 | 10/34 | Brooke et al. | 25—41.1 XR |
| 2,590,757 | 3/52 | Cornelius et al. | 18—48 |
| 2,615,202 | 10/52 | Talalay | 18—39 |
| 2,661,496 | 12/53 | Lubenow | 18—53 XR |
| 2,770,406 | 11/56 | Lane | 154—45.9 XR |
| 2,804,672 | 9/57 | Altshuler | 25—99 |
| 2,841,205 | 7/58 | Bird. | |
| 2,872,965 | 2/59 | Sisson | 18—48 XR |
| 2,894,918 | 7/59 | Killoran et al. | 260—2.5 |
| 2,898,632 | 8/59 | Irwin et al. | 18—48 |
| 2,929,793 | 3/60 | Hirsh | 18—48 XR |
| 2,962,407 | 11/60 | Aykanian | 18—48 XR |
| 2,977,639 | 4/61 | Barkhuff et al. | 18—48 XR |

FOREIGN PATENTS 1,165,798  6/58  France.

OTHER REFERENCES

CEN Staff Report, Chemical and Engineering News, vol. 30, No. 26, June 30, 1952, Fluorine Plastics: Versatile Teflon.

Koppers Booklet, 1954 dylite-expandable-polystyrene, pages 19, 21–26.

WILLIAM J. STEPHENSON, *Primary Examiner.*

MICHAEL V. BRINDISI, *Examiner.*